Figure 1:
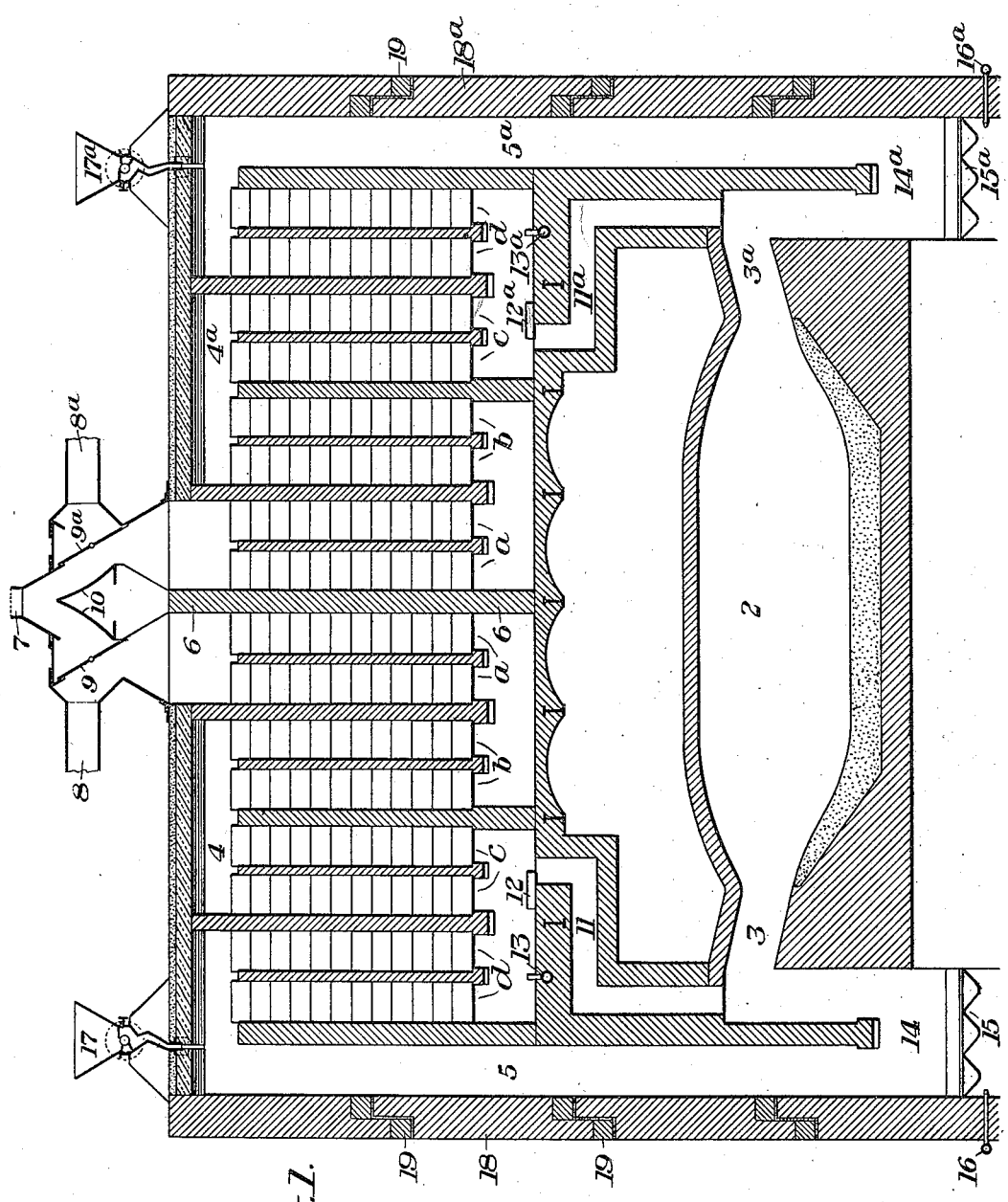

J. E. BELL.
REGENERATIVE FURNACE.
APPLICATION FILED JUNE 2, 1913.

1,170,397.

Patented Feb. 1, 1916.
3 SHEETS—SHEET 1.

WITNESSES
R A Balderson
Jesse B. Heller

INVENTOR
Jno. E. Bell.
by Bakewell, Byrnes Parmelee
Attys.

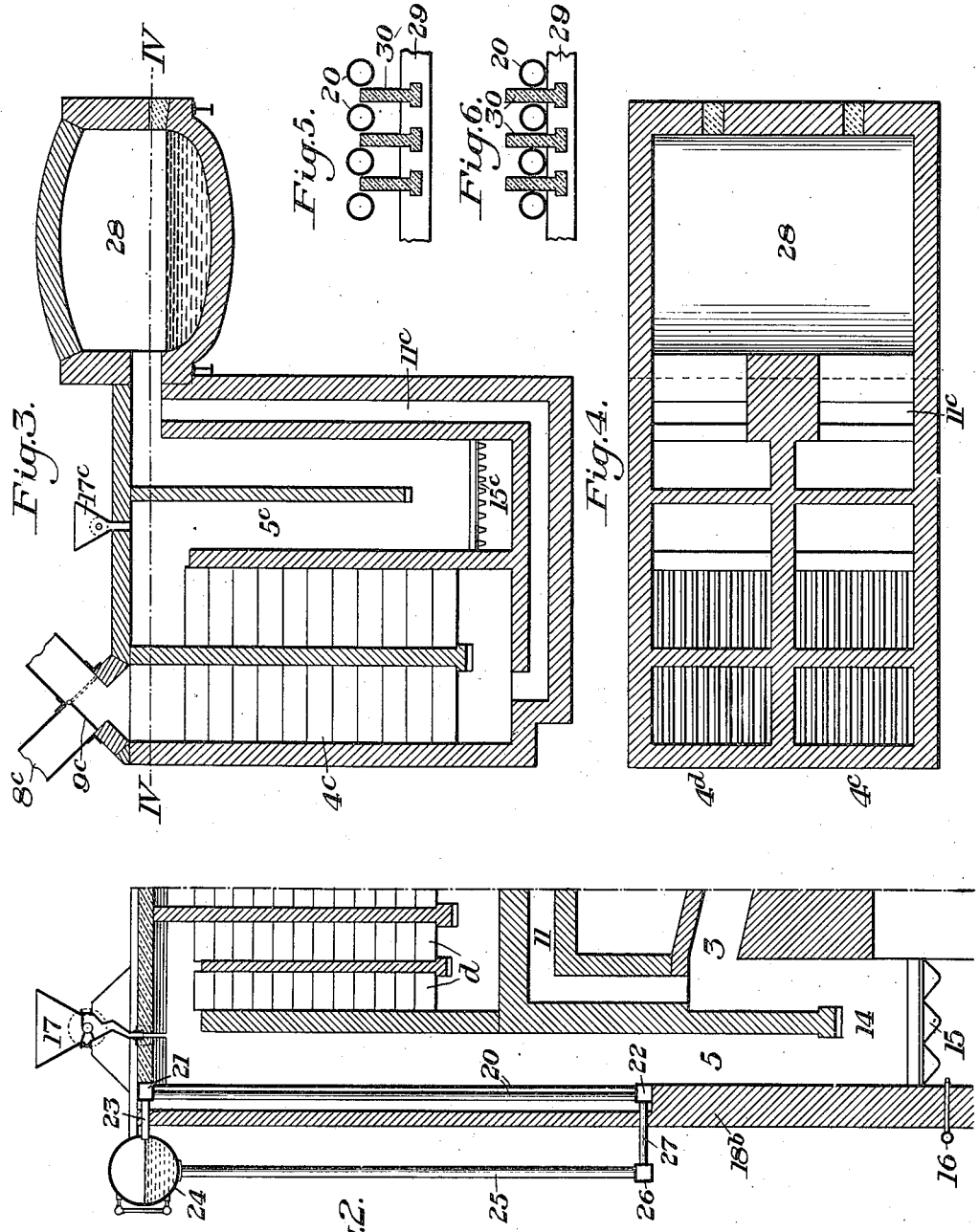

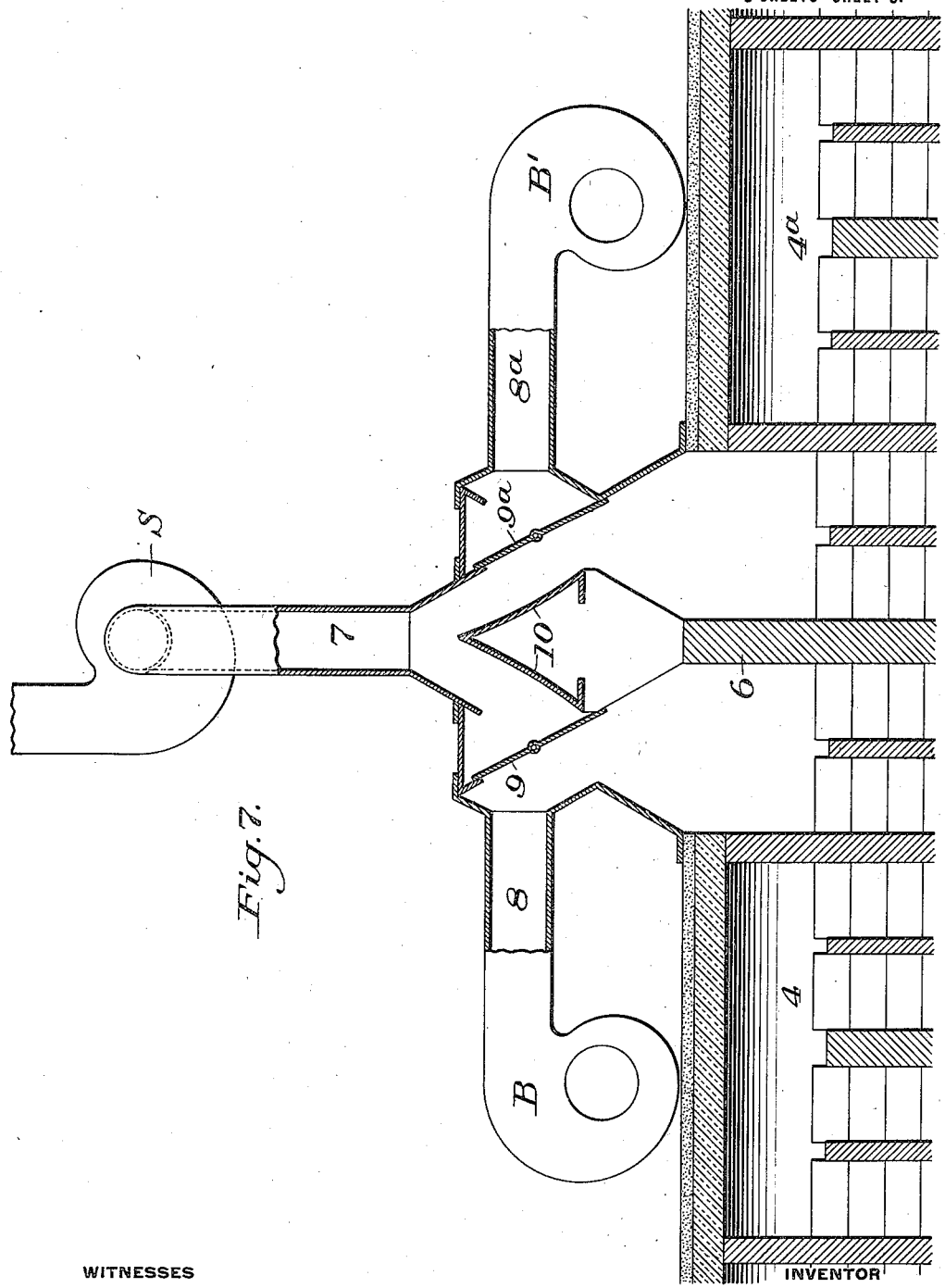

UNITED STATES PATENT OFFICE.

JOHN E. BELL, OF NEW YORK, N. Y.

REGENERATIVE FURNACE.

1,170,397.
Specification of Letters Patent.
Patented Feb. 1, 1916.

Application filed June 2, 1913. Serial No. 771,189.

*To all whom it may concern:*

Be it known that I, JOHN E. BELL, a citizen of the United States, residing at New York, in the county of New York and State of New York, have invented a new and useful Improvement in Regenerative Furnaces, of which the following is a full, clear, and exact description, reference being had to the accompanying drawings, forming part of this specification, in which:

Figure 1 is a vertical longitudinal section of an open hearth furnace showing one form of my invention; Fig. 2 is a partial longitudinal section showing a modified form; Fig. 3 is a longitudinal section showing another form of the invention; Fig. 4 is a cross section on the line IV—IV of Fig. 3; and Figs. 5 and 6 are detail views of a refractory shutter hereinafter referred to. Fig. 7 is a view showing a portion of an open-hearth furnace in vertical section, and also showing, more or less conventionally, one arrangement of fans for producing both forced and induced draft in the regenerators.

My invention relates to the class of regenerative heating or metallurgical furnaces requiring a high temperature and is designed to increase the fuel economy, reduce the space occupied, and to permit more perfect control of the furnace as to temperature and character of the flame or heat. It provides a new system for utilizing as fuel pulverized coal which need not be crushed or ground to the fineness heretofore necessary. It provides for preheating all the air used for combustion from heat abstracted from the waste gases. It improves the location, structure and arrangement of the regenerators, making them more effective in their function of cooling the waste gases, and returning the heat so gained to the cycle. It improves and makes more flexible the present draft arrangements and provides for variation in the air supply as between primary and secondary air as well as the two jointly. It permits combining in one structure with the furnace the gas producers and regenerators and eliminates the losses incident to building them separately.

Heretofore, when powdered coal has been used or experimented with as fuel for furnaces of this class, it has been diffused through a current of cold air and blown into the warm air supply at the point where it enters the furnace chamber. To work successfully, the mixture of powdered coal and cold air must behave as a gas and produce a similar flame. This necessitates that the coal be dried and reduced to an almost impalpable powder. It must be crushed, dried and then ground. This requires a large plant of expensive machinery which uses a great amount of power in operation and is troublesome to maintain. The cost of preparing fuel in this way is in many instances prohibitive. In addition, there is a potential loss in using cold air for blowing the fuel into the furnace, as for maximum economy the entire air supply should be heated from the waste gas. Further, there is no way of separating the ash from the gases of combustion and it must find its way into the furnace or regenerator passages, where, in either case, its presence is objectionable.

In accordance with my invention, I propose to pulverize coal without drying in one operation, and to burn this pulverized coal within a chamber distinct and separate from the furnace chamber while in suspension in an atmosphere of preheated air or preheated air and superheated steam. This chamber is preferably so arranged that the air and fuel pass down vertically through it, and is of a height sufficient to give the larger particles of fuel time to be consumed while in suspension. The hot products of combustion then flow into the furnace and a secondary combustion may be effected by introducing auxiliary air, preferably heated, at the point where the products enter the furnace port.

To limit the rise in temperature in the separate combustion chamber and thus reduce destructive action on the brickwork, I may either introduce steam, which will absorb a considerable amount of heat in its decomposition, or I may absorb a portion of this heat by water-heating surface suitably located in or forming a part of the wall of this chamber, or I may use both. If the steam is introduced, it will be broken up, its oxygen combining with the carbon of the coal to form carbon monoxid and the hydrogen remaining free. As this is an endothermic reaction, the rise in temperature during combustion will be limited and the primary air uniting with the coal will be less than that required for complete combustion. In the second or alternative method, one or more walls of the combustion chamber will contain or be formed of water-heating surfaces and these surfaces will directly absorb the heat radiated from the fuel during combustion and thus hold down the temperature to any desirable point. The amount of these water-heating surfaces which is exposed may be adjusted by means hereinafter described. I also preferably turn the gases of combustion through a sharp angle at the bottom of the combustion chamber to collect the ash and unburned particles of coal on a suitable grate at this point, and under this grate I may introduce steam or steam and air, as in the usual gas producer method. This will aid in consuming any unburned carbon and prevent the formation of hard clinker.

The present practice in constructing regenerators is to arrange the passages and checkerwork so that the draft produced by the columns of hot air brings the air needed for combustion into the furnace chamber. This requires that the regenerator passages be designed not only to produce the draft, but also to give small obstruction to its flow. However arranged, the checker chambers must be below the furnace. I propose to force the air through the regenerators by a fan or steam blower or by other suitable means. I can on this account locate the regenerators wherever desired, but I preferably locate them above the furnace.

I have discovered that the regenerators commonly used with these furnaces are very ineffective and that this is in large part due to the low velocity of the gas and air through the passages. Other things remaining the same, the rate of transfer of heat in a regenerator will be nearly directly proportional to the velocity of the gas. I therefore preferably make my regenerators of flat rectangular tile placed on edge and by bringing them together or placing them farther apart, I can give any desired gas velocity. I have also discovered that at low velocities, and particularly at high temperature, the gas has a tendency to direct or stream line flow, whereas a mixing or eddy flow is necessary for rapid heat transfer. By a "mixing" or "eddy" flow, I mean that the gas has the internal motions made visible in dense smoke rolling from the top of a stack. A direct or stream line flow will break down into this motion at sufficiently high velocities. This critical velocity is inversely proportional to the width of the gas passages. The narrower the passages, the greater the critical velocity. To insure the eddy or mixing flow, I prefer on this account to obtain the high velocity by dividing my regenerator into a number of passes by partition walls or baffles, rather than by reducing the area of the gas passages. In arranging my regenerators, I first select the shape and the size of the opening and then make at least a sufficient number of passes to insure a mixing flow in every pass.

The present practice in regenerator construction gives a weight of gas per hour per square foot of flue area of less than one thousand pounds and probably averages nearer five hundred pounds. I preferably raise this to from two thousand pounds to four thousand pounds. I have also found that irregular or tortuous passages do not increase the heat transfer in a mixed or eddy flow and since they obstruct the draft, I therefore preferably arrange my regenerators with straight smooth passages which fact, taken in conjunction with the shape of the tile, makes it possible to put a great deal more absorbing surface in a given space than heretofore.

In the drawings, referring to the form of Fig. 1, 2 represents an open hearth furnace having the usual end ports 3, 3$^a$. Above the top of this furnace, I build a pair of regenerative chambers 4, 4$^a$, divided into a series of passes. In the form shown, each pass is divided into separate passages by a partition wall. At the ends of the regenerators, I locate the vertically extending combustion chambers 5, 5$^a$, which preferably extend down to a point below the furnace ports.

Above the wall 6 between the two regenerators, I place the reversing valve system. In the form shown, 7 is an inlet from a section fan S, while 8 and 8$^a$ are passageways leading to the blowers B, B', respectively. The oscillating valves 9, 9$^a$ coact with the dividing ridge 10, and suitable seats in the stack ports, to direct the entering air into one of the regenerators and the gases from the other regenerator to the stack or fan.

The up and down passes in the regenerators are marked $a$, $b$, $c$ and $d$. From one of these passes, I preferably by-pass a portion of the air through channels 11, or 11$^a$, taking it direct to the furnace port. This auxiliary or secondary air may be controlled by suitable refractory dampers 12, 12$^a$. If steam is used to limit the rise in temperature, I may feed steam in at any suitable point of the regenerator, for instance, by use of the steam jets shown at 13 and 13$^a$, or I may use the steam to blow the fuel into the combustion chamber.

In the chambers 14, 14$^a$, below the combustion chambers, I preferably provide grates 15, 15$^a$ with steam jets 16, 16$^a$ beneath them. Unconsumed coal will drop on these grates and under the grate I preferably introduce steam or steam and air as in usual gas producer practice.

The numerals 17, 17$^a$ represent coal feeders, which preferably drop the coal in a sheet or curtain the full width of the combustion chamber, the coal, of course, being fed alternately first in one combustion chamber and then into the other during the reversals.

The end walls 18, 18ª are preferably formed in sections having offset joints with yielding packing 19 between them.

In using this apparatus, air is forced into one regenerator, this being the right hand one, with valves in the position shown in Fig. 1. This air flows through the reduced sized channels of the regenerator, and the primary air enters the top of the combustion chamber and flows down with the sheet of powdered coal, dropping through the right hand feeder. This coal burns in suspension during its descent, any unconsumed particles dropping on the right hand grate as the products reverse the direction of flow in the chamber 14ª. Leaving the furnace, the products of combustion pass through the other combustion chamber 5, which now forms an outlet flue and thence through the left-hand regenerator. Owing to the presence of both forced and induced draft, the air flows at considerable velocity through one regenerator, and similarly the products of combustion through the other regenerator, whence they pass to the stack. The secondary air taken from either regenerator through the bypass enters the hot gas at the entrance of the furnace and sets up secondary combustion. In this arrangement, the combustion chamber and regenerator are combined in one structure. There is no chance for cooling of the gas between the combustion chamber and furnace or between the furnace and regenerators. Both the primary and secondary air are heated from the regenerators and the steam used in the producers as well.

In Fig. 2, I show a portion of a furnace similar to that of Fig. 1, except that instead of limiting the rise in temperature by admitting steam, I provide water-heating surface for this purpose. In this case, the end walls 18ᵇ forming the side walls of the combustion chambers are provided with water-heating surfaces in the form of water tubes 20. These tubes may form part of a boiler of any desired type, and in the form shown, I provide upper and lower headers 21 and 22, which the pipes enter. From the upper header connecting pipes 23 lead to a steam and water drum 24, from which a tube or tubes 25 exterior to the furnace lead down to header 26, connecting the pipes 27 with the header 22. This water-heating surface will reduce the temperature by absorbing radiant heat from the curtain of flame. I may use both water-heating surface and injected steam to carry out this function of reducing the temperature.

In Figs. 1 and 2, the regenerators are shown as superimposed above the furnace chamber, thus giving economy of space and construction cost. I may, however, place the regenerators at one side of and below the furnace. Thus, in Figs. 3 and 4, I show a structure wherein a horse-shoe furnace 28 is provided, the fuel and gas being fed in and out on the same side of the furnace. In this case, the regenerators 4ᶜ and 4ᵈ are located side by side at one side of and below the furnace chamber. In these figures, parts similar to those in Fig. 1 are indicated by similar numerals with the letter "c" applied.

In order to still further regulate the temperature in the combustion chamber, I may also use a damper system in connection with water-heating surface. Thus, in Figs. 5 and 6, I show a portion of a refractory shutter 29, having spaced apart tiles 30, projecting therefrom between the water tubes, such as shown at 20 in Fig. 2. The shutter may be moved back and forth to expose more or less of the heating surface to the heat, thus regulating the amount of heat absorbed by the water tubes. By using these movable projecting tiles and varying the amount of steam fed in and the proportions of the primary and secondary air, as well as the amount of fuel, full control can be had over the temperature and the flames. By sharply turning back the gases of combustion at the bottom of the curtain wall at the end of the combustion chamber, the ash and unburnt particles of coal will be dropped out of the gases and rest on the grate, which may be used as a gas producer. I thus consume any unburnt carbon and at the same time avoid the formation of a hard clinker.

It will be noted that, in effect, I provide a regenerator furnace with a gas producer intermediate its regenerators and the furnace chamber, since the action which takes place in the primary or preliminary combustion chambers is the formation of a producer gas from the powdered fuel. In the operation of regenerative furnaces, it is not only desirable to obtain as perfect a degree of combustion as possible, but the production of a long controllable flame in the furnace chamber is also essential. By forming a combustible gas in the preliminary combustion chamber and by burning the powdered fuel in a controlling supply of hot air from the regenerators under certain conditions in which producer reactions occur, I obtain both these desired results in an efficient and highly economical manner.

The advantages of my invention will be appreciated by those skilled in the art.

The process gives great economy of fuel, a low stack temperature and highly efficient combustion. The transfer of heat to and from the checkerwork of the regenerators is enhanced and the control of temperature and flame is greatly improved. Heat losses are reduced and economy in space and original cost of the structure is reduced.

Many changes may be made in the form and arrangement of the regenerators, the furnace, coal feeders, etc., without departing from my invention.

Certain features of my invention may also be used with or without the other features within the scope of my claims.

I claim:

1. The herein described method of operating regenerative furnaces, which consists in preheating air in a regenerator, then feeding powdered coal to and burning it in the preheated air between the regenerator and the furnace chamber under conditions which cause a producer reaction to form a combustible gas, and then passing this gas into the furnace for further combustion, substantially as described.

2. The method of operating regenerative furnaces, consisting in heating air in a regenerator, dividing said heated air, feeding pulverized fuel into one portion of the air and burning the same under conditions which cause a producer reaction between the regenerator and the furnace chamber to form a combustible gas, and then supplying the other portion of air to said gases before they enter the furnace, substantially as described.

3. The herein described method of operating regenerative furnaces, which consists in heating air in a regenerator, feeding pulverized solid fuel into said heated air, and burning the same in suspension in the air under conditions which cause a producer reaction to form a combustible gas, and then feeding this gas into a furnace, and limiting the rise in temperature in the combustion chamber, substantially as described.

4. The method of operating regenerative furnaces, which consists in heating the air in a regenerator, feeding pulverized solid fuel into a portion of said air, burning the fuel in suspension in said air between the regenerator and the furnace chamber to form a combustible gas, and then supplying another portion of heated air to said gas, and limiting the rise in temperature in the combustion chamber, substantially as described.

5. The method of operating regenerative furnaces, which consists in heating air in a regenerator, supplying a pulverized solid fuel to the heated air and burning the same to form a combustible gas in a combustion chamber separate from the furnace chamber, and then passing said gas into the furnace chamber for further combustion, and changing the direction of flow of the gas between the combustion chamber and the furnace chamber for the purpose of causing the gas to deposit ash, substantially as described.

6. The herein described method of operating regenerative furnaces, which consists in heating air in a regenerator of the furnace, feeding pulverized solid fuel into the heated air, and burning said fuel to form a combustible gas in a combustion chamber between the regenerator and the furnace chamber, passing said gas from the combustion chamber into the furnace chamber, and taking the gases from the furnace chamber through the regenerator, substantially as described.

7. The method of operating regenerative furnaces, which consists in heating air in a regenerator, feeding pulverized solid fuel into the preheated air and burning this mixture in a combustion chamber outside of the furnace chamber to form a combustible gas, supplying steam to the combustion chamber to limit the temperature therein, and then feeding the combustible gas into the furnace chamber, substantially as described.

8. The method of operating regenerative furnaces, which consists in heating air in a regenerator, feeding pulverized solid fuel into the preheated air and burning this mixture in a combustion chamber outside of the furnace chamber to form a combustible gas, supplying steam to the combustion chamber to limit the temperature therein, then feeding the combustible gas into the furnace chamber, and supplying a further portion of hot air to said combustible gas, substantially as described.

9. The method of operating regenerative furnaces, consisting in heating air in a regenerator, feeding the pulverized fuel into said heated air, feeding the burning mixture through a vertical combustion chamber, changing the direction of flow of the mixture, then feeding a further supply of hot air into the mixture and passing the same into the furnace, substantially as described.

10. The method of operating a regenerative furnace, which consists in forcing air through a regenerator to preheat the air, mixing pulverized solid fuel with the preheated air, and burning the mixture between the regenerator and the furnace chamber to form a combustible gas, and drawing the products of combustion from the furnace chamber through the regenerator by induced draft, substantially as described.

11. A regenerative furnace having a regenerator, a preliminary combustion chamber located between the regenerator and the furnace chamber proper, means for feeding powdered fuel into the upper portion of said chamber and causing it to fall by gravity therein, means for supplying preheated air to said chamber, means for furnishing a further supply of air to the furnace chamber proper, and means for causing the combustible gas formed in the preliminary chamber to change its course in passing from the preliminary chamber to the furnace chamber and thereby causing it to deposit its contained ash, substantially as described.

12. In the operating of regenerative furnaces, the step consisting of forcing air or gases through a regenerator and thence through the furnace chamber, and drawing them by induced draft through the other regenerator, and maintaining a velocity of at least two thousand pounds of gas per hour per square foot of sectional area through the hotter parts of the regenerator, substantially as described.

13. A regenerative furnace having a preliminary combustion or gasification chamber located between the regenerator and the furnace chamber of the furnace, means for supplying heated air from the regenerator to said chamber, and means for feeding powdered solid fuel into said chamber whereby the fuel is burned to a combustible gas in said chamber before passing to the furnace chamber proper, substantially as described.

14. A regenerative furnace having a separate combustion chamber located between a regenerator and the furnace chamber proper, means for supplying heated air from the regenerator to said chamber, means for feeding pulverized solid fuel into said chamber, and a pressure blower arranged to force air through the regenerator, substantially as described.

15. A reversing regenerative furnace having a combustion or gasification chamber located between each of its regenerators and the furnace chamber, means for supplying heated air from the regenerators to said chambers, and means for feeding powdered solid fuel into each of said chambers, substantially as described.

16. A reversing regenerative furnace having a combustion or gasification chamber located between each of its regenerators and the furnace chamber, means for supplying heated air from the regenerators to said chambers, and means for feeding powdered solid fuel into each of said chambers, together with means for limiting the rise in temperature in said chambers, substantially as described.

17. A reversing regenerative furnace having a combustion or gasification chamber located between each of its regenerators and the furnace chamber, means for supplying heated air from the regenerators to said chambers, means for feeding powdered solid fuel into each of said chambers, a pressure blower arranged to force air through the regenerators, and a suction fan arranged to draw the hot gases through the regenerators, substantially as described.

18. A regenerative furnace having a vertically extending combustion chamber located between its regenerators and the furnace chamber proper, and means for feeding pulverized fuel and hot air through said combustion chamber to form a combustible gas therein, substantially as described.

19. A regenerative furnace having a vertically extending combustion chamber located between its regenerators and the furnace chamber proper, and means for feeding pulverized fuel and hot air through said combustion chamber to form a combustible gas therein, the connection between said chamber and the furnace chamber having a turn therein to change the direction of flow of gases in passing from the combustion chamber into the furnace chamber, substantially as described.

20. A regenerative furnace having a vertically arranged combustion chamber between its regenerators and the furnace chamber proper, means for supplying hot air to said chamber from the regenerators, and means for feeding powdered fuel into the upper portion of said chamber whereby the fuel may be burned while in suspension in the heated air in said chamber to form a combustible gas, substantially as described.

21. A regenerative furnace having a combustion or gasification chamber between its regenerators and the furnace chamber proper, means for supplying heated air to said chamber from the regenerators, means for supplying powdered fuel to said chamber, and means for supplying additional heated air from the regenerators to mix with the combustible gas formed in said chamber before said gas enters the furnace chamber proper, substantially as described.

22. A single furnace structure having a furnace chamber, a regenerator, and a pulverized fuel combustion chamber intermediate the regenerator and the furnace chamber substantially as described.

23. A single furnace structure having a furnace chamber, a pair of regenerators and a pair of pulverized fuel combustion chambers combined in the same structure, and located between the regenerators and the furnace chamber, the combustion chambers having pulverized fuel feeders, substantially as described.

24. A regenerator having each of its passes divided into a plurality of parallel flues, and fan means for maintaining a velocity equal to at least two thousand pounds of gas per hour per square foot of sectional free area in each pass, substantially as described.

25. A regenerator having a plurality of passes, and means for maintaining a velocity in said passes equal to at least two thousand pounds per square foot of free sectional area in each pass, substantially as described.

26. A regenerator having each of its passes divided into a plurality of vertical parallel flues, and fan means for maintaining a velocity equal to at least two thousand pounds of gas per hour per square foot of sectional free area in each pass, substantially as described.

27. A furnace having a serial pass regenerator through which the waste gases flow through all of the passes, and means whereby both the primary and secondary air are heated together in the earlier of said passes and the primary air is further heated in the final passes, substantially as described.

28. A furnace having a serial pass regenerator through which the waste gases flow through all of the passes, and means whereby both the primary and secondary air are heated together in the earlier passes and the primary air and steam is further heated in the final passes, substantially as described.

29. A regenerator having a plurality of successive up and down passes, and a plurality of flues in each pass, and means for maintaining a velocity in said passes equal to at least two thousand pounds per square foot of free sectional area in each pass, substantially as described.

30. A single furnace structure having a furnace chamber, a regenerator, and a pulverized fuel combustion chamber therein, and the regenerator having serial passes through all of which the waste gases flow, with means whereby upon reversal both the primary and secondary air are heated together in the earlier of said passes, and the primary air and steam is further heated in the final passes, substantially as described.

In testimony whereof, I have hereunto set my hand.

JOHN E. BELL.

Witnesses:
M. MÜLLER,
WALTER V. BALMFORD.